(12) United States Patent
Asano (10) Patent No.: US 12,242,130 B2
(45) Date of Patent: Mar. 4, 2025

(54) VIBRATION-TYPE DRIVING APPARATUS AND APPARATUS HAVING THE SAME

(71) Applicant: CANON KABUSHIKI KAISHA, Tokyo (JP)

(72) Inventor: Kota Asano, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 747 days.

(21) Appl. No.: 17/477,938

(22) Filed: Sep. 17, 2021

(65) Prior Publication Data

US 2022/0099915 A1    Mar. 31, 2022

(30) Foreign Application Priority Data

Sep. 30, 2020  (JP) ................. 2020-166207

(51) Int. Cl.
*G02B 7/04* (2021.01)
*G03B 13/34* (2021.01)
*H02N 2/00* (2006.01)
*H02N 2/02* (2006.01)

(52) U.S. Cl.
CPC ............... *G02B 7/04* (2013.01); *G03B 13/34* (2013.01); *H02N 2/0065* (2013.01); *H02N 2/026* (2013.01)

(58) Field of Classification Search
CPC ......... G02B 7/04; H02N 2/0065; G03B 13/34
See application file for complete search history.

(56) References Cited

U.S. PATENT DOCUMENTS

| 10,236,798 B2 | 3/2019 | Kimura |
| 2019/0052194 A1 | 2/2019 | Ninomiya et al. |
| 2019/0245460 A1 | 8/2019 | Yamasaki et al. |

FOREIGN PATENT DOCUMENTS

| JP | H05161370 A |   | 6/1993 |
| JP | 2014236522 A | * | 12/2014 |
| JP | 2015104144 A |   | 6/2015 |
| JP | 2019037054 A |   | 3/2019 |
| JP | 2019039997 A |   | 3/2019 |
| JP | 2019140764 A |   | 8/2019 |

OTHER PUBLICATIONS

JP,05-161370A English Translation, downloaded from J-PLAT PAT website (Year: 1993).*

* cited by examiner

*Primary Examiner* — Minh Q Phan
(74) *Attorney, Agent, or Firm* — ROSSI, KIMMS & McDOWELL LLP (57) ABSTRACT

A vibration-type driving apparatus includes a vibrator unit including a vibrator in which vibration is excited by an electro-mechanical energy convertor and a holder configured to hold the vibrator, and a contact body in contact with the vibrator. The vibrator and the contact body move relative to each other when vibration at a frequency higher than an audible range is excited in the vibrator. A predetermined condition is satisfied.

14 Claims, 8 Drawing Sheets

VIBRATION-TYPE DRIVING APPARATUS AND APPARATUS HAVING THE SAME

BACKGROUND OF THE INVENTION

Field of the Invention

The present disclosure relates to a vibration-type driving apparatus which causes a vibrator in which vibration is excited and a contact body in contact with the vibrator to move relative to each other.

Description of the Related Art

As a vibration-type driving apparatus such as a vibration-type motor that generates a driving force by using vibration excited by a piezoelectric element, Japanese Patent Application Laid-Open No. ("JP") 2015-104144 describes a vibration-type driving apparatus including a holder holding a vibrator and a moving plate, which is movable integrally with the holder and is guided by a guide member, which is a ball, in a moving direction. In this vibration-type driving apparatus, a vibration damping member is disposed between the holder and the moving plate so that abnormal noise is hindered from occurring, the abnormal noise being caused by repeated collisions between the moving plate and the guide member at the time of acceleration/deceleration or reciprocating driving at high speed.

However, when the vibration damping member is used as in JP 2015-104144, the addition of the vibration damping member causes an increase in the number of assembling steps and an increase in a size of the apparatus. Further, JP 2015-104144 does not consider abnormal noise in the audible range generated in a contact body due to vibration of the vibrator. That is, when the vibrator vibrates, the contact body in contact with the vibrator also vibrates. The vibrator may resonate due to a relationship between a vibration frequency in the audible range in which the vibrator is most likely to vibrate and a vibration frequency of the contact body or a driving frequency of the vibrator. When the vibrator resonates, abnormal noise in the audible range occurs.

SUMMARY OF THE INVENTION

The present disclosure provides a vibration-type driving apparatus which can hinder abnormal noise in the audible range from occurring without adding a new member, and an apparatus having the same.

A vibration-type driving apparatus according to one aspect of the present disclosure includes a vibrator unit including a vibrator in which vibration is excited by an electro-mechanical energy convertor and a holder configured to hold the vibrator, and a contact body in contact with the vibrator. The vibrator and the contact body move relative to each other when vibration at a frequency higher than an audible range is excited in the vibrator. A predetermined condition is satisfied.

An apparatus including the above vibration-type driving apparatus also constitute another aspect of the present disclosure.

Further features of the present disclosure will become apparent from the following description of exemplary embodiments with reference to the attached drawings.

DESCRIPTION OF THE EMBODIMENTS

Referring now to the accompanying drawings, a description will be given of embodiments according to the present disclosure.

First Embodiment

Figure 1:
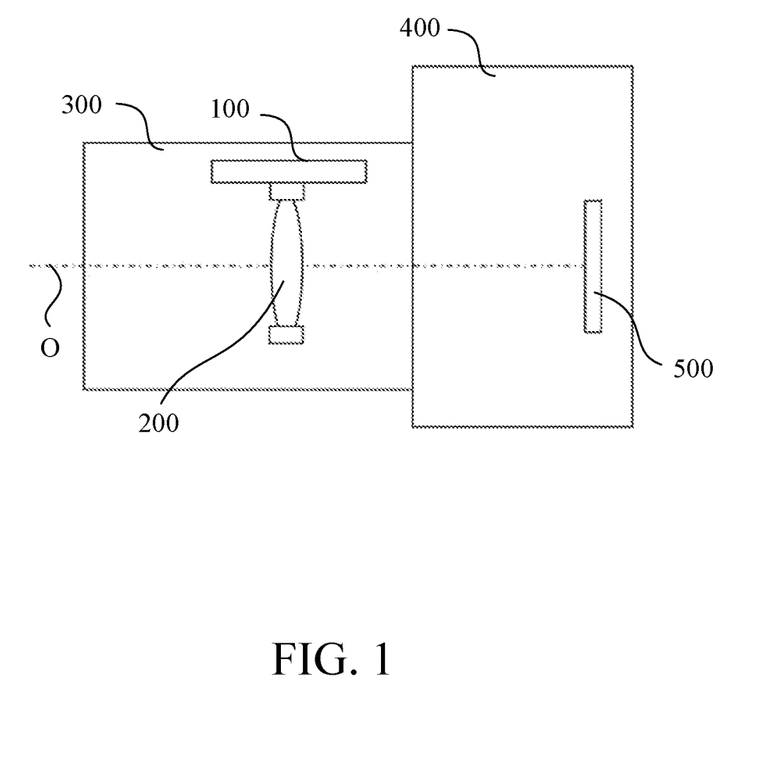
FIG. 1 is a sectional view illustrating a configuration of an image pickup apparatus according to embodiments.

FIG. 1 illustrates a configuration of an image pickup apparatus as an optical apparatus including a linear vibration-type motor unit 100 as a vibration-type driving apparatus according to a first embodiment of the present disclosure. The image pickup apparatus includes an image pickup lens unit 300 and a camera body 400 to which the image pickup lens unit 300 is detachably attachable or integrally provided. The image pickup lens unit 300 includes inside the linear vibration-type motor unit 100 and a focus lens 200 as a driven member driven by the vibration-type motor unit 100 in a direction in which an optical axis O of the image pickup lens unit 300 extends, which is also referred to as an optical axis direction.

The camera body 400 includes inside an image sensor 500 such as a CCD sensor or a CMOS sensor configured to capture, i.e., to photoelectrically convert, an object image formed by an image pickup optical system including a focus lens 200 in the image pickup lens unit 300. The focus lens 200 moves in the optical axis direction and performs focusing so that the object image is in focus on the image sensor 500.

The vibration-type driving apparatus may be provided in an optical apparatus other than the image pickup apparatus or in various apparatuses other than the optical apparatus.

Figure 2A:
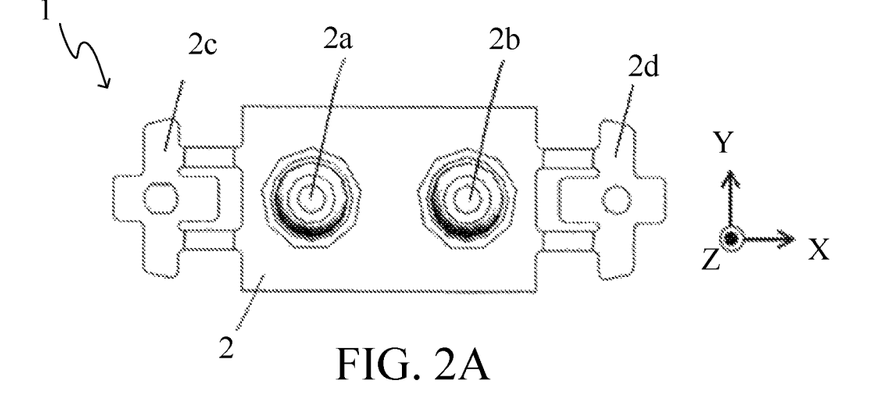
FIGS. 2A to 2D are diagrams illustrating a configuration and an operation of a vibrator according to the embodiments.
Figure 2B:
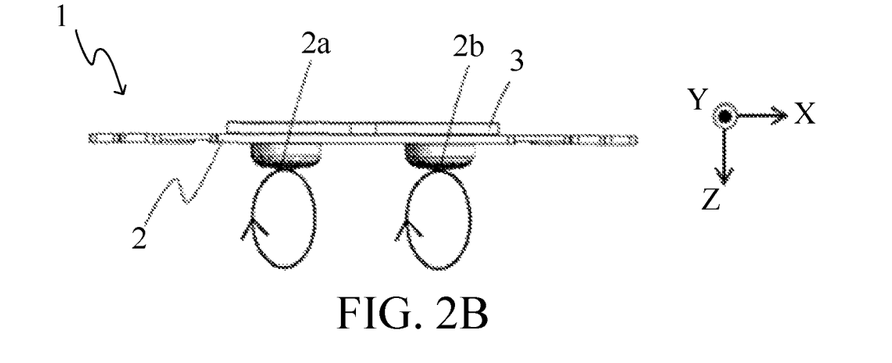

FIGS. 2A and 2B illustrate a vibrator 1 of the linear vibration-type motor unit 100. In FIGS. 2A and 2B, a +z direction is a direction in which the vibrator 1 comes into contact with a friction member 11 as a contact body described later and in which the vibrator 1 is pressurized against and in contact with the friction member 11 by pressing by a pressurizing unit described later, and an x direction is a direction in which the vibrator 1 and the friction member 11 move relative to each other. A y direction is a direction orthogonal to the x direction and the z direction. FIG. 2A illustrates the vibrator 1 viewed from the +z direction, and FIG. 2B illustrates the vibrator 1 viewed from the +y direction.

Figure 2C:
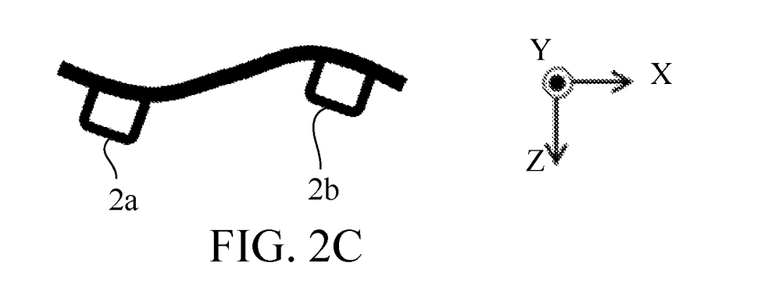
Figure 2D:
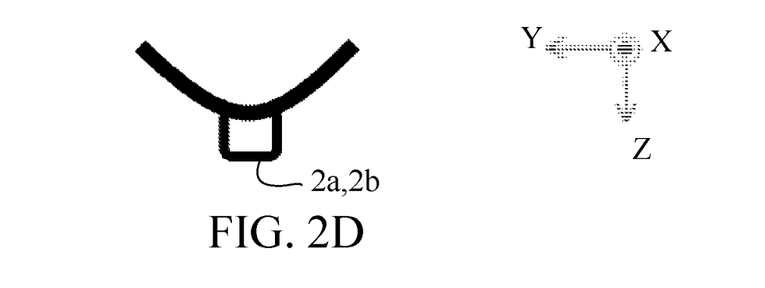

The vibrator 1 includes an elastic body 2 and a piezoelectric element 3 as an electro-mechanical energy convertor adhered to the elastic body 2. The elastic body 2 includes driving protrusions 2a and 2b, which are separated from each other in the x direction, and fixed arm portions 2c and 2d disposed at both ends in the x direction. A two-phase high-frequency voltage is applied to the piezoelectric element 3 via a flexible printed circuit board (not illustrated). When the two-phase high-frequency voltage is applied to the piezoelectric element 3, vibration is excited in the elastic body 2 by an electric-mechanical energy conversion (electrostriction) action of the piezoelectric element 3. At this time, vibration in the x direction as illustrated in FIG. 2C and vibration in the z direction as illustrated in FIG. 2D are excited in the elastic body 2. As a result, as illustrated in FIG. 2B, at tips of the driving protrusions 2a and 2b, feeding vibration in the x direction and push-up vibration in the z direction are combined and spheroidal motion in the xz plane is caused.

In this embodiment, a frequency, which is a driving frequency, of the high-frequency voltage applied to the piezoelectric element 3 is 89 kHz, and a normal vibration state, i.e., a normal vibration mode, at this driving frequency is as illustrated in FIGS. 2C and 2D. In this vibration mode, when the driving protrusions 2a and 2b are pressurized against and in contact with the friction member 11 described later, the frictional force between them causes the vibrator 1 and the friction member 11 to move relative to each other.

Figure 3:
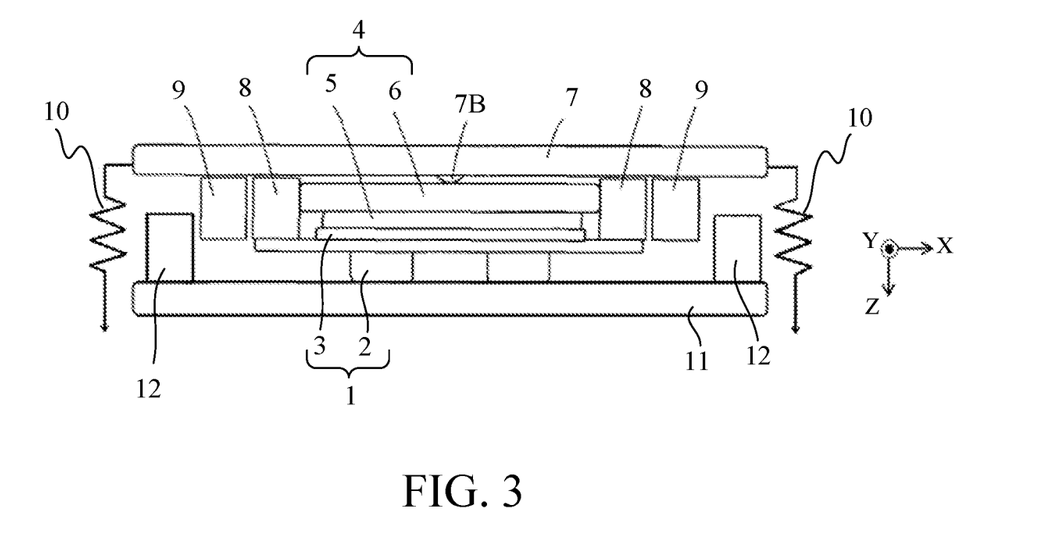
FIG. 3 is a diagram illustrating a vibration-type motor according to the embodiments.

FIG. 3 illustrates a linear vibration-type motor unit 100 viewed from the +y direction. A fixing member 12 is fixed to the focus lens 200 illustrated in FIG. 1 by a screw, and fixes and holds the friction member 11 via a screw. The friction member 11 transmits, to a second pressurizing plate 7, a pressurizing force from the pressurizing member 10 connected to a movable plate (not illustrated). Four pressurizing members 10 are arranged around the vibrator 1 in the xy plane.

A lower surface of the second pressurizing plate 7 is provided with two hemispherical-shaped protrusions 7B at the same position in the x direction and separated from each other in the y direction. These two protrusions 7B are in contact with an upper surface of a high rigid plate 6 as a first pressurizing plate which is made of metal or the like and faces the second pressurizing plate 7, the upper surface being a surface opposite to a vibration isolating member 5 described later.

The vibration isolating member 5 is disposed between a lower surface of the high rigid plate 6 and the piezoelectric element 3 of the vibrator 1 illustrated in FIGS. 2A and 2B. Thereby, the pressurizing force from the pressurizing member 10 acts on the vibrator 1 via the second pressurizing plate 7, the high rigid plate 6 and the vibration isolating member 5 and pressurizes the vibrator 1 against the friction member 11. As a result, the driving protrusions 2a and 2b of the vibrator 1 are pressurized against and in contact with the friction member 11.

The vibration isolating member 5 transmits the pressurizing force to the vibrator 1 without inhibiting the vibration excited in the vibrator 1. The vibration isolating member 5 may be made of felt, butyl rubber or gel.

In this embodiment, a pressure transferring member 4 includes the high rigid plate 6 and the vibration isolating member 5, and a pressurizing unit includes the pressure transferring member 4, the pressurizing plate 7, the pressurizing member 10, and the movable plate. In this embodiment, a tension coil spring is used as the pressurizing member 10, but a compression spring may be used.

The fixed arm portions 2c and 2d of the vibrator 1 are fixed to a vibrator holder 8 by adhesion or the like. Thereby, a vibrator unit is acquired in which the vibrator 1 and the vibrator holder 8 are integrated. A movable supporting member 9 is integrated with the movable plate (not illustrated) by a screw. A ball (not illustrated) is disposed between the movable plate and a guide member (not illustrated), which is fixed to the fixing member 12 by a screw so that the guide member is parallel to a surface of the friction member 11, the surface being in contact with the driving protrusions 2a and 2b. When the movable plate receives the pressurizing force from the pressurizing member 10 connected to the movable plate, the guide member and the movable plate holds the ball in the z direction. The guide member is provided with a guide groove portion as a V-groove portion extending in the x direction, and the ball is disposed in this guide groove portion. Thereby, the vibrator unit is movably guided in the x direction.

In this embodiment, the movable portion including the vibrator unit (1, 8), the pressure transferring member 4 (5, 6), the second pressurizing plate 7, the movable supporting member 9, the pressurizing member 10, and the movable plate moves in the x direction relative to a fixed unit including the friction member 11, the fixing member 12 and the guide member.

Figure 4A:
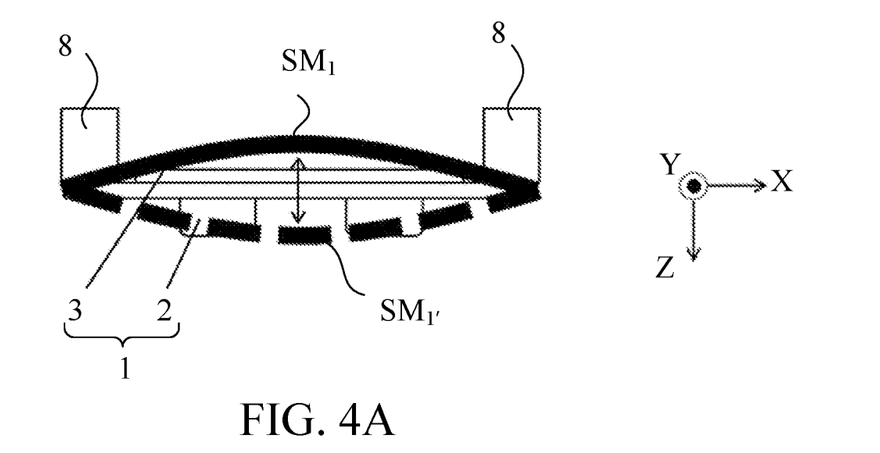
FIGS. 4A and 4B are diagrams illustrating a vibration mode of the vibrator and a friction member according to the embodiments.
Figure 5A:
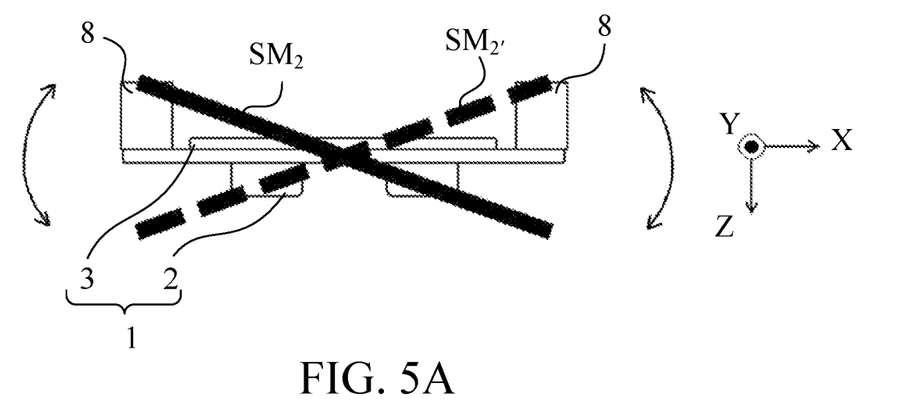
FIGS. 5A and 5B are diagrams illustrating a vibration mode of the vibrator and the friction member according to the embodiments.

Next, a description will be given of a mechanism of generating noise in the audible range caused by an occurrence of resonance in the vibrator unit with reference to FIGS. 4A to 7D. FIG. 4A illustrates the vibrator 1 and the vibrator holder 8 of the vibrator unit as viewed from the +y direction. In this drawing, a heavy solid line $SM_1$ and a heavy broken line $SM_{1'}$ represent primary out-of-plane vibration, which is a vibration mode in the Z direction generated in the vibrator unit. FIG. 5A illustrates the vibrator 1 and the vibrator holder 8 of the vibrator unit as viewed from the +y direction. In this drawing, a heavy solid line $SM_2$ and a heavy broken line $S_{M2'}$ represent primary rotational vibration, which is a vibration mode in a rotational direction around a Y axis, i.e., in a pitch direction, generated in the vibrator unit. Vibration frequencies (natural frequencies) of the vibrator unit in this embodiment are 4.5 kHz in FIG. 4A and 4.8 kHz in FIG. 5A. These frequencies correspond to frequencies $f_{SM1}$, $f_{SM2}$, $f_{SM3}$, ..., $f_{SMN}$ (N is an integer) of the vibration modes in the audible range among a plurality of vibration modes of the vibrator unit. Here, $f_{SM1}$=4.5 kHz and $f_{SM2}$=4.8 kHz, which are representative vibration frequencies, are given as examples.

As illustrated in FIG. 4A, the vibration mode of the vibrator unit is different from the normal vibration mode illustrated in FIGS. 2B to 2D. The 4.5 kHz and 4.8 kHz vibration modes described as the above examples are frequencies within the audible range of 20 Hz to 20 kHz, and these vibration modes increase vibration in the vibrator unit and cause abnormal noise in the audible range. This abnormal noise may cause user's discomfort when the linear vibration-type motor unit 100 of this embodiment is used for zoom driving or focus driving of an optical apparatus such as an interchangeable lens and an image pickup apparatus, or may be recorded as unnecessary noise when a motion image is captured.

Figure 4B:
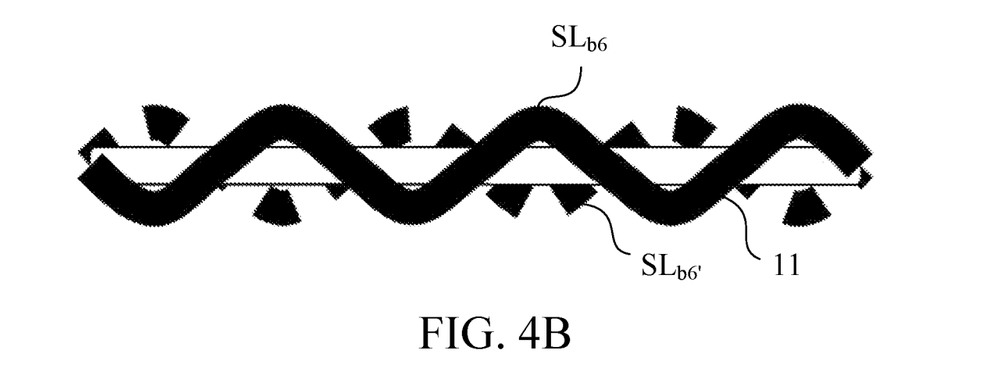
Figure 5B:
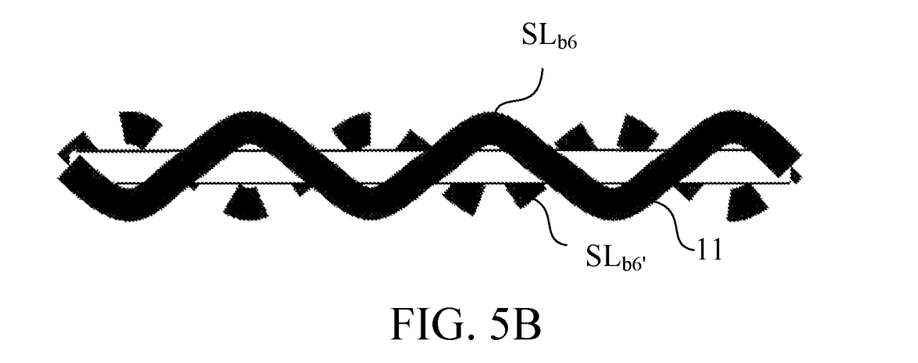

In FIGS. 4B and 5B, a heavy solid line $SL_{b6}$ and a heavy broken line $SL_{b6'}$ represent out-of-plane vibration, which is a sixth-order natural vibration mode generated in the friction member 11 when spheroidal motion in the xz plane is excited at the tips of the driving protrusions 2a and 2b of the vibrator 1 and the vibration is transmitted to the friction member 11. A frequency of the sixth-order natural vibration mode, which is a natural frequency, of the friction member 11 in this embodiment is 84.5 kHz, which corresponds to a frequency $f_{SL}$ ($f_{SLb6}$) of the out-of-plane vibration occurring in friction member 11.

As described above, the frequency of the high-frequency voltage applied to the piezoelectric element 3 in this embodiment is 89 kHz, which corresponds to a driving frequency $f_D$ of the vibrator 1. The frequency of 89 kHz is in the ultrasonic range above 20 kHz, which is higher than the audible range.

Figure 6A:
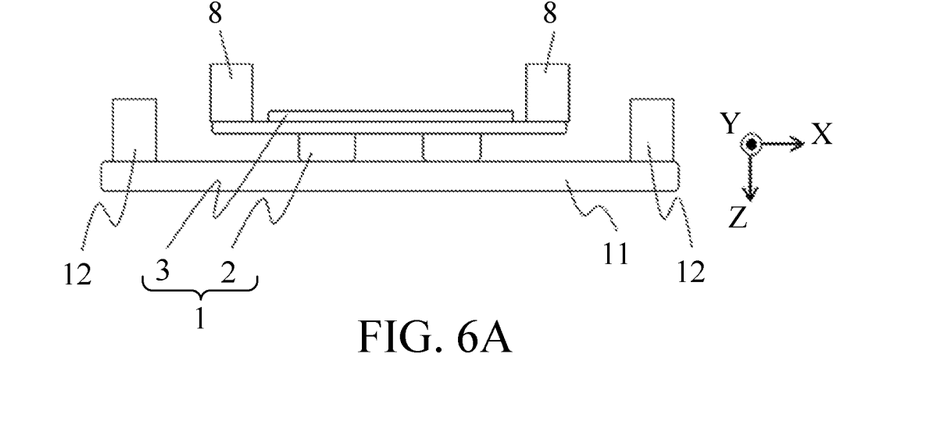
FIGS. 6A to 6D are diagrams illustrating a mechanism of an occurrence of abnormal noise in the audible range.
Figure 6B:
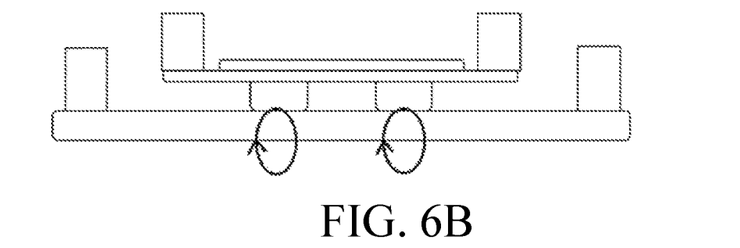

FIG. 6A illustrates the vibrator 1, the vibrator holder 8, the friction member 11 and the fixing member 12 of the linear vibration-type motor unit 100 illustrated in FIG. 3, as viewed from the +y direction. FIG. 6B illustrates a state in which the two-phase high-frequency voltage is applied to the piezoelectric element 3 and the spheroidal motion in the xz plane is excited at the tips of the driving protrusions 2a and 2b. In this state, since the driving protrusions 2a and 2b are pressurized against and in contact with the friction member 11 and friction occurs between them, the vibration of the vibrator 1 is transmitted to the friction member 11.

Figure 6C:
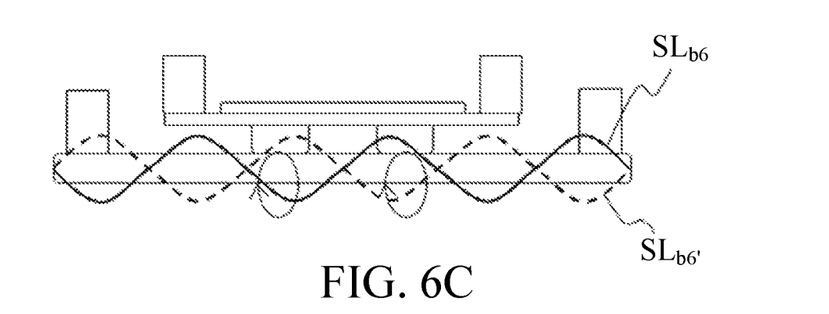

FIG. 6C illustrates a state in which the friction member 11 vibrates with its natural frequency after the state of FIG. 6B. Here, a state is illustrated in which the friction member 11 is in the sixth-order natural vibration mode and vibrates in the out-of-plane direction. There are various natural vibration modes in a manner of primary, secondary, and so on, and there are various vibration directions such as in-plane and out-of-plane. Here, the out-of-plane vibration of the sixth-order natural vibration mode is described.

Figure 6D:
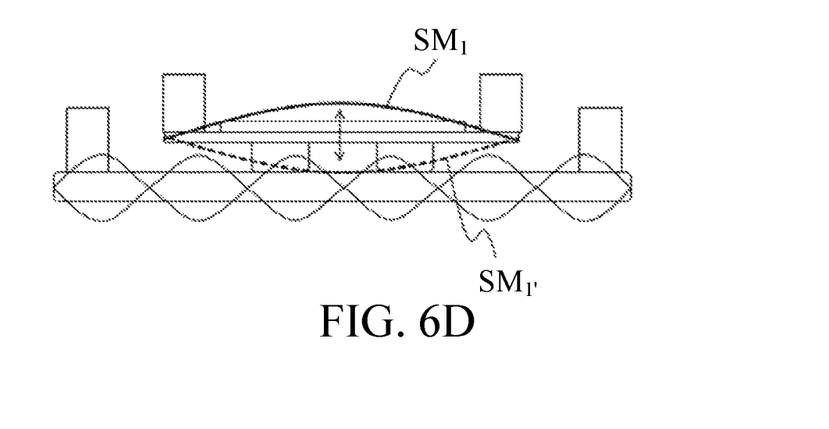

In FIG. 6D, the friction member 11 is vibrating in the sixth-order natural vibration mode as illustrated in FIG. 6C, and the vibrator unit to which the vibration is transmitted vibrates with the primary out-of-plane vibration represented by a heavy solid line $SM_1$ and a heavy broken line $SM_{1'}$, the out-of-plane vibration being the vibration mode in the Z direction as illustrated in FIG. 4A.

When the vibrator 1 vibrates at the driving frequency, the vibrator unit and the friction member 11 receive each other's vibrations, and as the vibrations approach their natural frequencies, amplitudes of the vibrations increase and the state eventually becomes a resonant state.

The condition in which the resonance is strong is expressed by the following expression (1).

$$f_D \pm f_{SMN} = f_{SL} \quad (1)$$

As described above, $f_D$ represents the driving frequency of the vibrator 1, $f_{SMN}$ represents the frequency $f_{SM1}$, $f_{SM2}$, $f_{SM3}$, ..., or $f_{SMN}$ (N is an integer) of a vibration mode in the audible range among the plurality of vibration modes of the vibrator unit, and $f_{SL}$ represents the frequency of out-of-plane vibration of the friction member 11. In this embodiment, $f_{SL}$ is the frequency $f_{SLb6}$ of the sixth-order natural vibration mode.

For example, if the above-described frequency is substituted into the expression (1), the following equation is established.

89−4.5=84.5($f_{SLb6}$) kHz

This embodiment focuses on the out-of-plane vibration of the sixth-order natural vibration mode of the friction member 11, but if, for example, a frequency $f_{SLb7}$ of the out-of-plane vibration of a seventh-order natural vibration mode is substituted into the expression (1), the following equation is established.

89+4.5=93.5 kHz

That is, the expression (1) indicates that the frequency ($f_D \pm f_{SMN}$) matches with the frequency $f_{SL}$ of the out-of-plane vibration of the friction member 11, the frequency ($f_D \pm f_{SMN}$) being acquired by adding or subtracting, to or from the driving frequency $f_D$ of the vibrator 1, the frequency $f_{SM1}$, $f_{SM2}$, $f_{SM3}$, ..., or $f_{SMN}$ (N is an integer) of the vibration mode in the audible range among the plurality of vibration modes of the vibrator unit. In this state, abnormal noise in the audible range is likely to occur as described above. It is necessary to satisfy the following expression (2) so that the abnormal noise in the audible range is hindered from occurring.

$$f_D \pm f_{SMN} \neq f_{SL} \quad (2)$$

The difference between $f_D \pm f_{SM}$ and $f_{SL}$ may be 0.4 kHz or more, and may be 1.0 kHz or more.

Figure 7A:
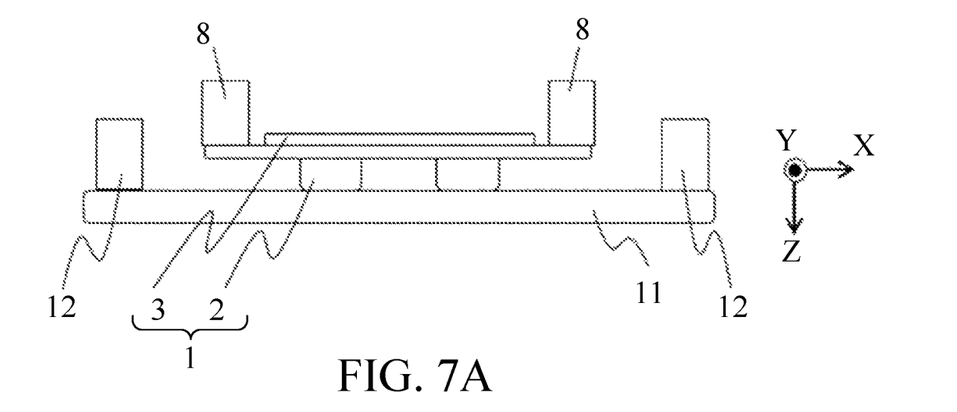
FIGS. 7A to 7D are diagrams illustrating a mechanism of an occurrence of abnormal noise in the audible range.

A specific example will be described below. FIG. 7A illustrates the vibrator 1, the vibrator holder 8, the friction member 11 and the fixing member 12 of the linear vibration-type motor unit 100 illustrated in FIG. 3, when viewed from the +y direction.

Figure 7B:
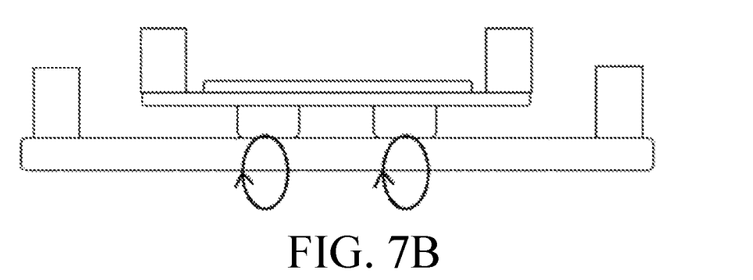

FIG. 7B illustrates a state in which a two-phase high-frequency voltage is applied to the piezoelectric element 3 and the spheroidal motion in the xz plane is excited at the tips of the driving protrusions 2a and 2b. In this state, since the driving protrusions 2a and 2b are pressurized against and in contact with the friction member 11 and friction occurs between them, the vibration of the vibrator 1 is transmitted to the friction member 11.

Figure 7C:
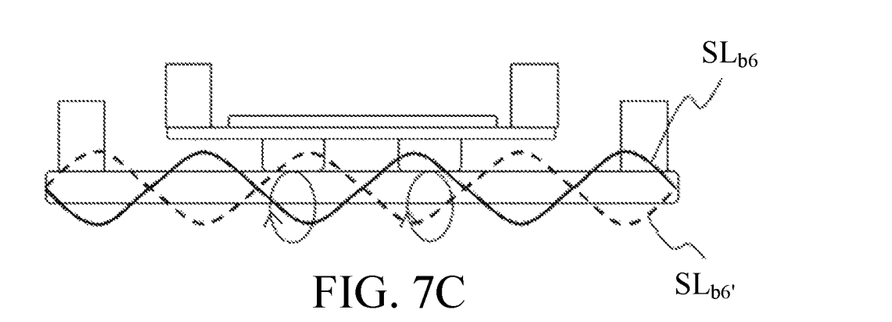

FIG. 7C illustrates a state in which the friction member 11 vibrates with its natural frequency after the state of FIG. 7B. Here, a state is illustrated in which the friction member 11 is in the sixth-order natural vibration mode and vibrates in the out-of-plane direction. There are various natural vibration modes in a manner of primary, secondary, and so on, and there are various vibration directions such as in-plane and out-of-plane. Here, the out-of-plane vibration of the sixth-order natural vibration mode is described.

Figure 7D:
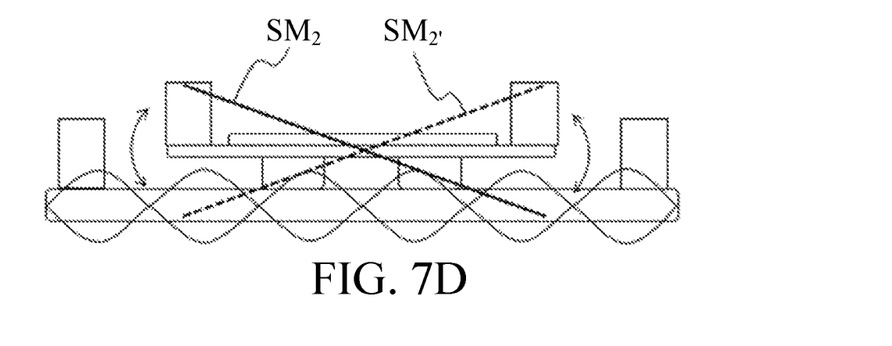

In FIG. 7D, vibration of the sixth-order natural vibration mode occurs, and the vibrator unit to which the vibration is transmitted vibrates with the primary rotational vibration represented by the heavy solid line $SM_2$ and the heavy broken line $SM_{2'}$, the primary rotational vibration being the vibration mode in the rotational direction around the Y axis, i.e., in the pitch direction, as illustrated in FIG. 5A.

When the vibrator 1 vibrates at the driving frequency, the vibrator unit and the friction member 11 receive each other's vibrations, and as the vibrations approach their natural frequencies, amplitudes of the vibrations increase and the state eventually becomes a resonant state. The condition thereof is expressed by the above expression (1).

As described above, $f_D$ represents the driving frequency of the vibrator 1, $f_{SMN}$ represents the frequency $f_{SM1}$, $f_{SM2}$, $f_{SM3}$, ..., or $f_{SMN}$ (N is an integer) of a vibration mode in the audible range among the plurality of vibration modes of the vibrator unit, and $f_{SL}$ represents the frequency of out-of-plane vibration of the friction member 11. In this embodiment, $f_{SL}$ is the frequency $f_{SLb6}$ of the sixth-order natural vibration mode.

Here, when the above-mentioned frequency is substituted into the expression (1), the following equation is acquired.

89−4.8=84.2 kHz

The result does not exactly match with but is close to 84.5 ($f_{SLb6}$) kHz. This embodiment focuses on the out-of-plane vibration of the sixth-order natural vibration mode of the friction member 11, but for example, the frequency $f_{SLb7}$ of the out-of-plane vibration of the seventh-order natural vibration mode is as described above, and a detailed description thereof is omitted. That is, it is assumed that the expression (1) is established even when the frequency ($f_D \pm f_{SMN}$) does not exactly match with the frequency $f_{SL}$ of the out-of-plane vibration of the friction member 11, the frequency ($f_D \pm f_{SMN}$) being acquired by adding or subtracting, to or from the driving frequency $f_D$, the frequency $f_{SMN}$ (N is an integer) of the vibration mode in the audible range. A relationship between vibration and a frequency is not sharp but has a certain degree of spread, and an amplitude of vibration increases as a frequency approaches a natural frequency, that is, a frequency that affects resonance has some range. In this state, abnormal noise in the audible range is likely to occur. It is necessary to satisfy the following expression (2) so that the abnormal noise in the audible range is hindered from occurring.

$$f_D \pm f_{SMN} \neq f_{SL} \tag{2}$$

The difference between $f_D \pm f_{SM}$ and $f_{SL}$ may be 0.4 kHz or more, and may be 1.0 kHz or more.

Figure 8:
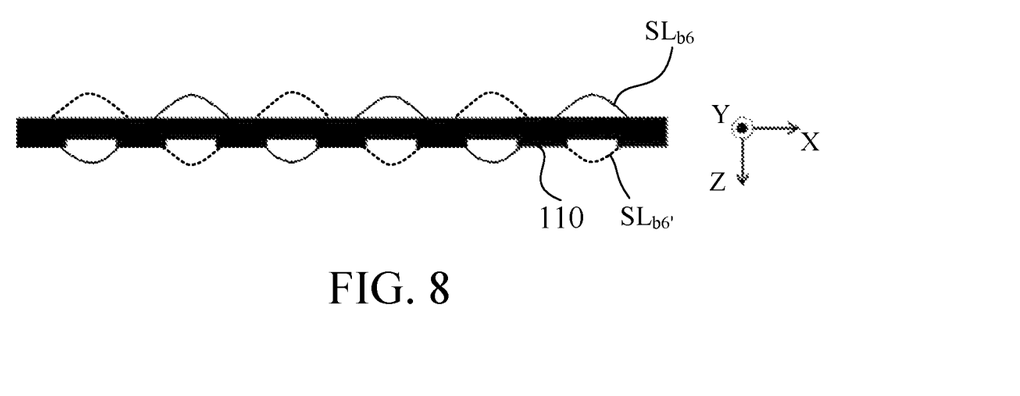
FIG. 8 is a diagram illustrating a friction member according to a first embodiment.

In this embodiment, a friction member 110 having a shape illustrated in FIG. 8 is used as the friction member 11 illustrated in FIG. 3. FIG. 8 illustrates the friction member 110 when viewed from the +y direction. In the friction member 110, with respect to $S_{Lb6}$ and $S_{Lb6'}$ indicating the out-of-plane vibration in the sixth-order natural vibration mode illustrated in FIGS. 4B and 5B, rigidity in the out-of-plane direction (z direction) at an anti-node portion in the x direction of the out-of-plane vibration is different from rigidity in the out-of-plane direction at a portion other than the anti-node portion in the x direction of the out-of-plane vibration. Specifically, in the friction member 110, a thickness in the z direction at the anti-node portion of the out-of-plane vibration is different from a thickness in the z direction at the portion other than the anti-node portion.

In particular, FIG. 8 illustrates an example in which rigidity in the z direction at the anti-node portion is made lower than rigidity in the z direction at the portion other than the anti-node portion. Specifically, an uneven shape is formed on a surface of the friction member 110, the surface being opposite to a surface in contact with the vibrator 1 (the driving protrusions 2a and 2b) so that the thickness in the z direction at the anti-node portion of the out-of-plane vibration is made thinner by 0.2 mm than the thickness in the z direction at the portion other than the anti-node portion.

Since the friction member 110 has such a shape, as compared with a case where the friction member 110 does not have such a shape, it is possible to lower the frequency of the out-of-plane vibration of each of the sixth- and seventh-order natural vibration modes of the friction member 110, the frequency being closest to a frequency acquired by adding or subtracting, to or from the driving frequency $f_D$ of the vibrator 1, the frequency $f_{SM1}, f_{SM2}, f_{SM3}, \ldots$, or $f_{SMN}$ (N is an integer) of the vibration mode in the audible range among the plurality of vibration modes of the vibrator unit. As a result, the expression (2):

$$f_D \pm f_{SMN} \neq f_{SL}$$

is satisfied, and abnormal noise in the audible range can be hindered from occurring.

Second Embodiment

Next, a second embodiment of the present disclosure will be described. This embodiment uses, as the friction member 11 illustrated in FIG. 3, a friction member 111 having a shape illustrated in FIG. 9A or a friction member 112 having a shape illustrated in FIG. 9B. In this embodiment, in a view from a direction in which the vibrator 1 comes into contact with each friction member, i.e., in a z direction view, in each of the friction members 111 and 112, a first range is a range in the x direction and overlaps a range in which the movable portion described above moves, and a second range is a range in the x direction and does not overlap the range in which the movable portion moves. Rigidity in the z direction in the first range is different from and rigidity in the z direction in the second range. Specifically, a thickness in the z direction in the first range is different from a thickness in the z direction in the second range. More specifically, a step is provided between the first range and the second range on a surface of the friction member 111 or 112, the surface being opposite to a surface in contact with the vibrator 1.

Figure 9A:
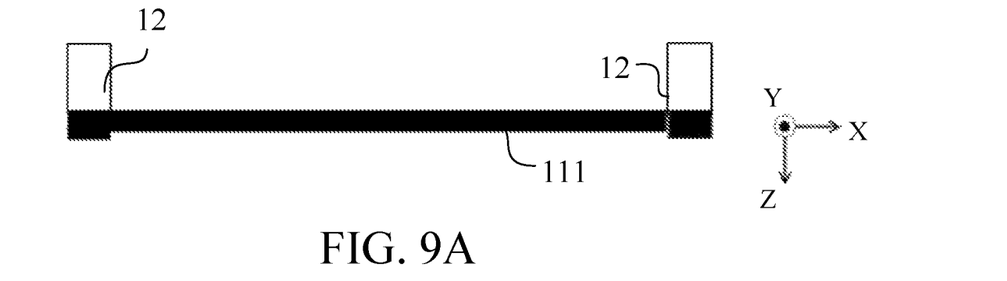
FIGS. 9A and 9B are diagrams each illustrating a friction member according to a second embodiment.

In the friction member 111, the thickness in the z direction in the first range is made thinner by 0.2 mm than the thickness in the z direction in the second range. As a result, in the friction member 111, the rigidity in the z direction of the first range is lower than the rigidity in the z direction of the second range.

Figure 9B:
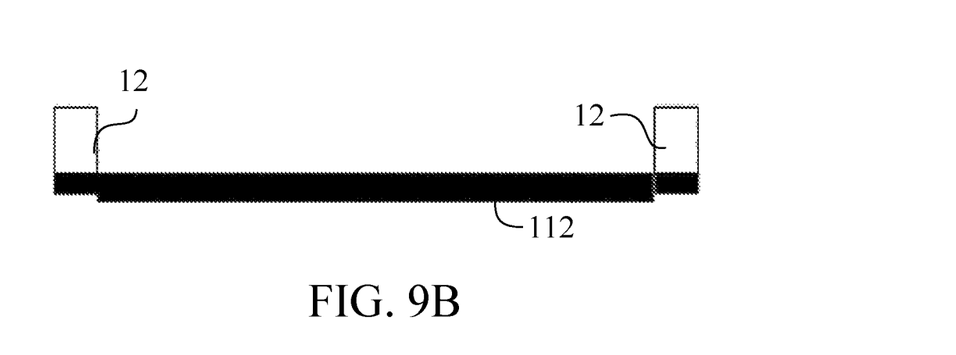

In friction member 112, the thickness in the z direction in the second range is made thinner by 0.2 mm than the thickness in the z direction in the first range. Thereby, in the friction member 112, the rigidity in the z direction of the second range is lower than the rigidity in the z direction of the first range.

Since the friction members 111 and 112 have these shapes, frequencies of out-of-plane vibration of sixth and seventh order natural vibration modes of the respective friction members become lower than those in a case where the friction members do not have the above shapes. As a result, $f_D \pm f_{SM} \neq f_{SL}$ of the expression (2) is satisfied, and it is possible to reduce the occurrence of abnormal noise in the audible range.

In each of the above embodiments, a description has been given of the vibration-type driving apparatus in which the vibrator and the friction member move relative to each other in the linear direction, but the present disclosure can also be applied to a vibration-type driving apparatus in which a vibrator and an annular friction member move relative to each other in a rotational direction.

According to the above embodiments, in the vibration-type driving apparatus, it is possible to reduce the occurrence of abnormal noise in the audible range without adding a new member.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-166207, filed on Sep. 30, 2020 which is hereby incorporated by reference herein in its entirety.

What is claimed is:

1. A vibration-type driving apparatus comprising:
   a vibrator unit including:
      a vibrator in which vibration is excited by an electro-mechanical energy convertor; and
      a holder configured to hold the vibrator;
   a contact body in contact with the vibrator, and
      a pressurizing unit configured to pressurize the vibrator so as to make the vibrator come into contact with the contact body, wherein the pressurizing unit includes:
a first pressurizing plate;
a vibration isolating member provided between the first pressurizing plate and the vibrator;
a second pressurizing plate facing the first pressurizing plate on an opposite side from the vibration isolating member, and having a protrusion coming into contact with the first pressurizing plate, and
a pressurizing member configured to provide the second pressurizing plate with a pressurizing force,
wherein the vibrator and the contact body move relative to each other when vibration at a frequency higher than an audible range is excited in the vibrator, and
wherein the contact body has a shape that satisfies a following condition:

$$f_D \pm f_{SMN} \neq f_{SL}$$

where $f_D$ represents a driving frequency of the vibrator, $f_{SMN}$ (N is an integer) represents a frequency of a vibration mode in the audible range among a plurality of vibration modes of the vibrator unit, and $f_{SL}$ represents a frequency of out-of-plane vibration occurring in the contact body.

2. The vibration-type driving apparatus according to claim 1,
wherein a difference between $f_D \pm f_{SMN}$ and $f_{SL}$ is 0.4 kHz or more.

3. The vibration-type driving apparatus according to claim 1,
wherein the contact body has a shape with which rigidity in an out-of-plane direction at an anti-node portion of out-of-plane vibration at $f_{SL}$ closest to $f_D \pm f_{SMN}$ is different from rigidity in the out-of-plane direction at a portion other than the anti-node portion.

4. The vibration-type driving apparatus according to claim 3,
wherein the contact body has a shape with which a thickness in the out-of-plane direction at the anti-node portion is different from a thickness in the out-of-plane direction at the portion other than the anti-node portion.

5. The vibration-type driving apparatus according to claim 4,
wherein the contact body has an uneven shape on a surface opposite to a surface in contact with the vibrator so that the thickness at the anti-node portion is different from the thickness at the portion other than the anti-node portion.

6. The vibration-type driving apparatus according to claim 1,
wherein the contact body has a shape with which rigidity in an out-of-plane direction in a first range is different from rigidity in the out-of-plane direction in a second range, the first range overlapping a range in which the vibrator moves when viewed from a direction in which the vibrator comes into contact with the contact body, a second range not overlapping the range in which the vibrator moves.

7. The vibration-type driving apparatus according to claim 1,
wherein on a surface opposite to a surface in contact with the vibrator, the contact body is provided with a step between the first range and the second range so that the thickness in the first range is different from the thickness in the second range.

8. The vibration-type driving apparatus according to claim 1,
wherein the vibrator includes two driving protrusions which are in contact with the contact body, and
wherein in the vibrator, vibration is excited that causes tips of the driving protrusions to perform spheroidal motion in a plane including (a) a direction in which the vibrator and the contact body move relative to each other, and (b) a direction in which the vibrator comes into contact with the contact body.

9. The vibration-type driving apparatus according to claim 1,
wherein among frequencies of vibration modes in the audible range of the vibrator unit, the $f_{SMN}$ is (a) a lowest-order vibration mode of vibration in a direction in which the vibrator comes into contact with the contact body, and (b) a lowest-order vibration mode of vibration mainly including rotation around an axis in a direction orthogonal to both directions in one of which the vibrator and the contact body move relative to each other and in the other of which the vibrator comes into contact with the contact body.

10. An apparatus comprising:
a vibration-type driving apparatus; and
a driven member driven by the vibration-type driving apparatus,
wherein the vibration-type driving apparatus includes:
a vibrator unit including:
a vibrator in which vibration is excited by an electromechanical energy convertor; and
a holder configured to hold the vibrator;
a contact body in contact with the vibrator, and
a pressurizing unit configured to pressurize the vibrator so as to make the vibrator come into contact with the contact body,
wherein the pressurizing unit includes:
a first pressurizing plate;
a vibration isolating member provided between the first pressurizing plate and the vibrator;
a second pressurizing plate facing the first pressurizing plate on an opposite side from the vibration isolating member, and having a protrusion coming into contact with the first pressurizing plate, and
a pressurizing member configured to provide the second pressurizing plate with a pressurizing force,
wherein the vibrator and the contact body move relative to each other when vibration at a frequency higher than an audible range is excited in the vibrator, and
wherein the contact body has a shape that satisfies a following condition:

$$f_D \pm f_{SMN} \neq f_{SL}$$

where $f_D$ represents a driving frequency of the vibrator, $f_{SMN}$ (N is an integer) represents a frequency of a vibration mode in the audible range among a plurality of vibration modes of the vibrator unit, and $f_{SL}$ represents a frequency of out-of-plane vibration occurring in the contact body.

11. The apparatus according to claim 10,
wherein the apparatus is an optical apparatus including a lens as the driven member.

12. A vibration-type driving apparatus comprising:
a vibrator unit including:
a vibrator in which vibration is excited by an electromechanical energy convertor; and
a holder configured to hold the vibrator; and
a contact body in contact with the vibrator,
wherein the vibrator and the contact body move relative to each other when vibration at a frequency higher than an audible range is excited in the vibrator, and wherein the contact body has a shape that satisfies a following condition:

$$f_D \pm f_{SMN} \neq f_{SL}$$

where $f_D$ represents a driving frequency of the vibrator, $f_{SMN}$ (N is an integer) represents a frequency of a vibration mode in the audible range among a plurality of vibration modes of the vibrator unit, and $f_{SL}$ represents a frequency of out-of-plane vibration occurring in the contact body, wherein the contact body has a shape with which rigidity in an out-of-plane direction at an anti-node portion of out-of-plane vibration at $f_{SL}$ closest to $f_D \pm f_{SMN}$ is different from rigidity in the out-of-plane direction at a portion other than the anti-node portion.

13. A vibration-type driving apparatus comprising:
a vibrator unit including:
a vibrator in which vibration is excited by an electro-mechanical energy convertor; and
a holder configured to hold the vibrator; and
a contact body in contact with the vibrator,
wherein the vibrator and the contact body move relative to each other when vibration at a frequency higher than an audible range is excited in the vibrator,
wherein the contact body has a shape with which rigidity in an out-of-plane direction in a first range is different from rigidity in the out-of-plane direction in a second range, the first range overlapping a range in which the vibrator moves when viewed from a direction in which the vibrator comes into contact with the contact body, a second range not overlapping the range in which the vibrator moves, and
wherein the contact body has a shape that satisfies a following condition:

$$f_D \pm f_{SMN} \neq f_{SL}$$

where $f_D$ represents a driving frequency of the vibrator, $f_{SMN}$ (N is an integer) represents a frequency of a vibration mode in the audible range among a plurality of vibration modes of the vibrator unit, and $f_{SL}$ represents a frequency of out-of-plane vibration occurring in the contact body.

14. A vibration-type driving apparatus comprising:
a vibrator unit including:
a vibrator in which vibration is excited by an electro-mechanical energy convertor; and
a holder configured to hold the vibrator; and
a contact body in contact with the vibrator,
wherein the vibrator and the contact body move relative to each other when vibration at a frequency higher than an audible range is excited in the vibrator, and
wherein the contact body has a shape that satisfies a following condition:

$$f_D \pm f_{SMN} \neq f_{SL}$$

where $f_D$ represents a driving frequency of the vibrator, $f_{SMN}$ (N is an integer) represents a frequency of a vibration mode in the audible range among a plurality of vibration modes of the vibrator unit, and $f_{SL}$ represents a frequency of out-of-plane vibration occurring in the contact body, wherein among frequencies of vibration modes in the audible range of the vibrator unit, the $f_{SMN}$ is (a) a lowest-order vibration mode of vibration in a direction in which the vibrator comes into contact with the contact body, and (b) a lowest-order vibration mode of vibration mainly including rotation around an axis in a direction orthogonal to both directions in one of which the vibrator and the contact body move relative to each other and in the other of which the vibrator comes into contact with the contact body.

* * * * *